Oct. 14, 1952 — J. L. YANCEY — 2,613,812
DEVICE FOR SEPARATING WATER FROM CRUDE OIL
Filed July 11, 1947 — 2 SHEETS—SHEET 1

Inventor
Joseph Lee Yancey
By Wilfred E. Lawson
Attorney

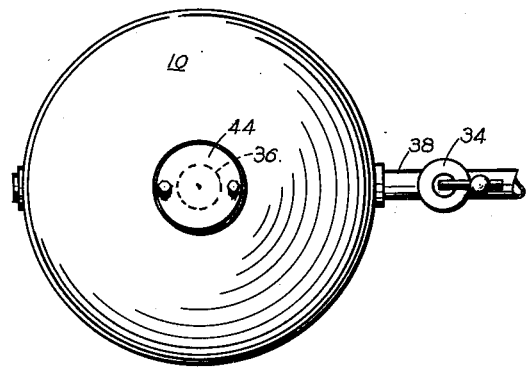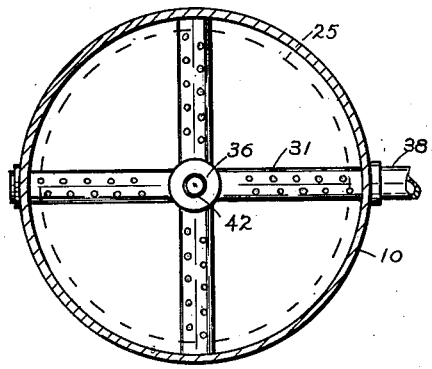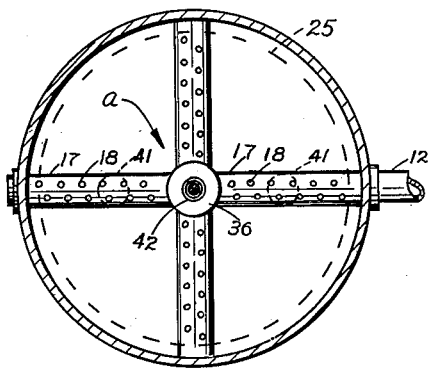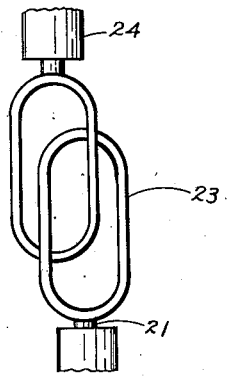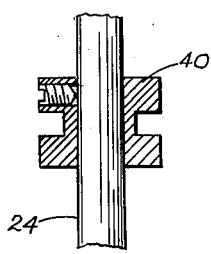

Patented Oct. 14, 1952

2,613,812

UNITED STATES PATENT OFFICE 2,613,812

DEVICE FOR SEPARATING WATER FROM CRUDE OIL

Joseph Lee Yancey, Great Bend, Kans.

Application July 11, 1947, Serial No. 760,367

4 Claims. (Cl. 210—54)

My invention relates to devices used for the purpose of separating free water from crude oil and the object of my invention is to provide a device adapted to remove the free water from the crude oil before the oil reaches the treating or refining system, so that the chemical substances are saved, which are absorbed by the water and would be lost through the syphoning action, and that the heating of the water is eliminated.

A further object of my invention is to provide a device of the character indicated above consisting in a tank provided with one or more inlet pipes and with a plumb bob valve, which is located at the bottom of the tank and serves the purpose to permit the water, which settles in the bottom portion of the tank, to flow out of the tank.

A still further object of my invention is to provide a device of the character indicated above, the plumb bob valve of which is controlled by two cooperating floats, one small float urging the valve permanently into closed position and a large float adapted to float in water but to sink in oil for opening the valve and permit the water to flow out of the tank.

Other objects of my invention not specifically mentioned may appear in the following specification describing my invention with reference to the accompanying drawing illustrating a preferred embodiment of my invention.

It is however to be understood, that my invention is not to be limited or restricted to the exact construction and combination of parts described in the specification and shown in the drawing, but that such changes and modifications can be made, which fall within the scope of the claims appended hereto.

In the several figures of the accompanying drawing forming a part of the description similar parts are indicated by similar index characters and Figure 1 is a vertical sectional view of the water knock-out according to my invention taken on a center plan of said device.

Figure 2 is a top plan view of Figure 1.

Figure 3 is a sectional view taken on line 3—3 in Figure 1.

Figure 4 is a sectional view taken on line 4—4 in Figure 1.

Figure 5 is a sectional view taken on line 5—5 in Figure 1.

Figure 7 is a detail view of a linkage inserted in the stem of the water outlet valve mounted on the bottom of the water knock-out tank.

The water-knock-out forming the subject matter of my invention comprises an upright elongated closed tank 10 forming the housing of the water-knock-out according to my invention.

Somewhat below the horizontal center plan of this tank a plurality of crude oil inlet holes 11 are provided in the wall of the tank 10, and for each hole a crude oil inlet pipe 12 is provided and is secured coaxially with the corresponding hole onto the tank 10 in any preferred manner, for instance by welding.

Figure 1:
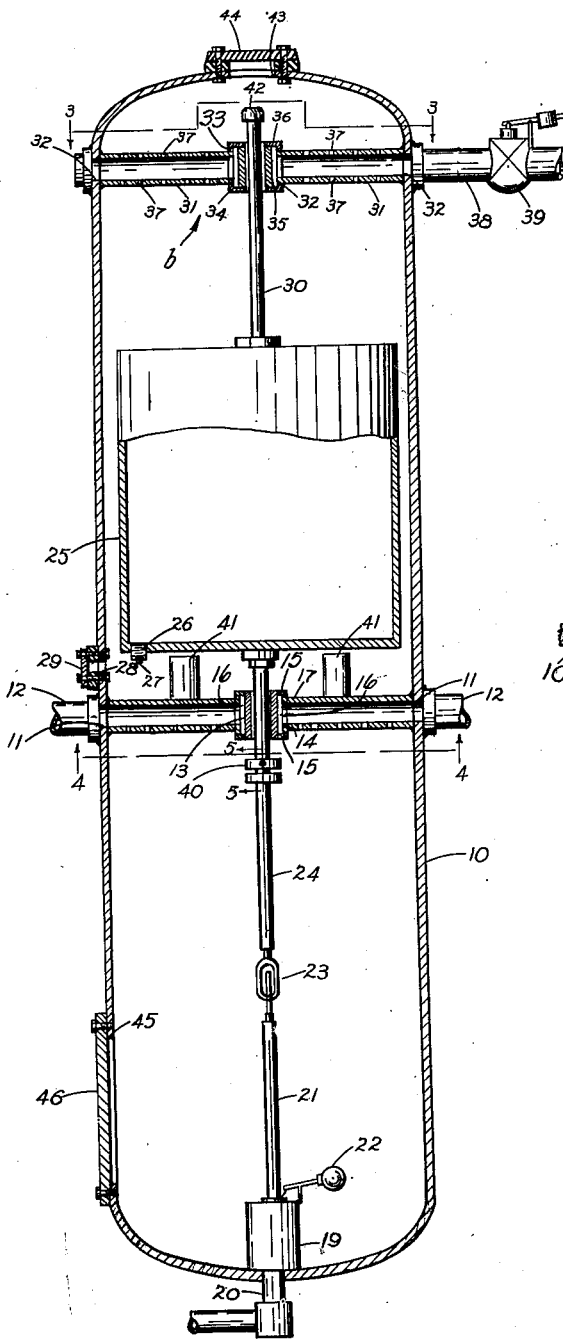
Figure 8:
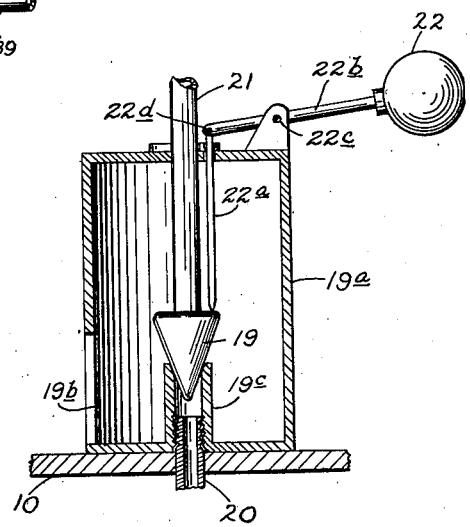
Figure 8 is a vertical section through the outlet valve structure.
Figure 6:
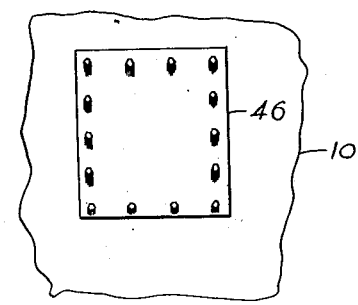
Figure 6 is a detail view of a cover for a manhole provided in the lower portion of the tank forming the housing of the water-knock-out according to my invention.

An inlet manifold a, Fig. 4, comprises a comparatively short centrally located vertical pipe 13, and another pipe 14, Fig. 1, surrounds the first mentioned pipe 13 and is held in coaxial position thereto by means of two annular plates 15 firmly secured to the pipes 13 and 14 at their upper and lower ends.

The outer pipe 14 is provided with a plurality of crude oil inlet holes 16, the number of these holes being equal to the number of crude oil inlet holes 11 in the tank 10.

Into each oil inlet hole 16 a diametrically extending pipe 17 is inserted and is firmly secured therein. In the lowermost portion of each diametrical manifold pipe 17 a plurality of holes 18 is provided, and the outer end of each of these pipes is secured to the inner surface of the tank 10, so that the pipes 17 are arranged coaxially with the crude oil inlet holes 11 in the tank 10.

The crude oil fed into the inlet pipes 12 is distributed over the entire surface of the bottom of the tank 10 through the distribution holes 18.

Water being heavier than oil, the free water in the crude oil will settle at the bottom of the tank 10 and the oil proper will rise toward the top of the tank.

The water is removed from the tank 10 in the following manner.

On the bottom of the tank a plumb bob type valve 19 is enclosed within a housing 19a, which has a side opening 19b communicating with the interior of the tank and a seat 19c, for the valve, which opens through its bottom in line with a water outlet pipe 20 leading from the bottom of the tank. The valve is made of non-corrosive material or Monel metal and has an upwardly extending control stem 21 and a control rod 22a extending upwardly alongside the stem, both the latter and the rod 22a projecting through the top wall of the housing, which is made also of non-corrosive material. A small float 22 has an arm 22b pivoted, as at 22c, to the top of the housing and, as at 22d, to the projecting end of the rod 22a, so that the rod 22a, together with the stem 21, is urged downwardly into valve closing position, when the small float 22 is raised upwardly by the water in the bottom of the tank 10.

On the upper end of the control stem 21 a linkage 23 is mounted, connecting said stem with a float rod 24 extending upwardly through the inner short pipe 13 of the crude oil inlet manifold and secured with its upper end to the bottom of a comparatively large hollow float 25 which is adapted to be weighted, for instance by mercury, so that it floats in water but sinks in oil.

In the bottom of the large float 25 a short drain pipe 26, closed by a removable plug 27 is arranged. A hand hole 28 in the tank 10 permits access to said drain plug, so that some of the mercury can be drawn out of the large float 25 to lighten the same. The hand hole 28 is closed by means of a hand hole cover 29 of conventional construction.

A guide pipe 30 is fastened to the top of the large float 25, so that it extends upwardly from and coaxially with said float and communicates with the interior thereof.

Adjacent to the top of the tank 10, Fig. 1, a draw-off manifold b is arranged. This draw-off manifold is constructed similar to the crude-oil inlet manifold a. It consists of a plurality of horizontal draw-off pipes 31, which are fastened with their outer ends on the inside of the tank 10, so that each pipe extends diametrically to the tank and coaxially with an oil-outlet hole 32 provided in the wall of the tank.

The inner ends of the draw-off manifold pipes 31 are secured in holes 33, Fig. 1, provided in a vertically arranged comparatively short outer pipe 34. An inner pipe 35 is secured to the outer pipe 34 in coaxial position therewith by means of annular plates 36 fastened to the ends of the inner and outer pipes 35 and 34.

Each draw-off manifold pipe 31 is provided with a plurality of oil intake holes, and coaxially with each oil-outlet hole 32 an oil-outlet pipe 38 is secured to the tank 10 and is equipped with a pressure regulating valve 39. These oil outlet pipes lead to the wash tank (not shown). The valve 39 is adapted to be adjusted to any pressure up to fifty pounds, enabling the operator to force the water up-grade if necessary to reach the gathering pit (not shown).

The guide pipe 30 extends slidably through the inner pipe 35 of the draw-off manifold b, so that the large float 25 is guided by this guide pipe 30 and the float rod 24 in its up and down movement. The upward movement of the large float 25 may be selectively limited by means of a lock nut 40 provided on the float rod 24 and the downward movement of said float is limited by means of metal brackets 41 secured on top of the inlet manifold pipes 17. This prevents the weight of the large float 25 to rest on the plumb bob type valve 19.

The float 25 is large enough to restrict the rise of the fluid in the tank 10, a condition adapted to help to knock out the excess water from the oil and cause it to settle in the bottom portion of the tank 10. The oil rises slowly around the float 25 to the top of the tank 10 and the draw-off manifold b.

The guide pipe 30 serves also as a means for adding mercury into the large float 25 and a screw cap 42 closes the top end of the guide pipe. The screw cap can be reached through a hand hole 43 in the top of the tank 10, which is usually closed by a hand hole cover 44 of conventional construction.

Adjacent to the bottom of the tank 10 a manhole 45 is provided closed by a removable manhole cover 46.

The linkage 23 permits the large float to move upwardly and downwardly to a certain degree without influencing the opening or closing of the plumb bob valve 19, which will be opened only when the upward movement of the large float excedes this degree.

The linkage 23 absorbs also any rotary movement of the large float 25 caused by the swirling motion of the oil rising about the float.

The manhole 45 permits the cleaning and adjusting of the lock nut 40, the linkage 23, the small float 22, and the plumb bob valve 19.

The latter is constructed, so that the water flows at all times over the valve stem 21. In case the lever of the small float 22 should be disengaged accidentally from the valve stem, the water pressure and the weight of the valve stem 21 will close the valve and prevent oil from entering the water line.

Having described my invention I claim as new and desire to secure by Letters Patent:

1. In a device for separating water from crude oil, an upright cylindrical tank, an oil intake manifold extending through the diametral center of the tank and having downwardly directed discharge apertures spaced along its lower side, a water outlet in the bottom of the tank, a valve element normally closing said outlet, a float controlling said valve and effecting closing of the same upon a predetermined rise in the level of the water, a stem rising from said valve, a second float within the tank above said manifold, a guide rod depending from said second float, a link coupling between the ends of said stem and the guide rod to allow for a limited movement of said second float relatively to the first float, said second float being of a specific gravity whereby it will sink in oil and be raised by water, a guide element rising from the upper side of said second float, guide means cooperative with said guide rod and the guide element for maintaining said second float concentric with respect to the side wall of the tank, and a second manifold extending through the upper end of the tank diametrically thereof for discharging the separated oil from the tank, said second manifold having downwardly directed inlet apertures spaced along its lower side.

2. The invention as defined in claim 1, with the said second float of a diameter but slightly less than that of the interior of the tank so as to restrict the rise of the crude oil past the same and thus aid in the separation of the water therefrom, and the said guide element is of tubular form for the introduction of a weighting fluid into the second float to equalize its specific gravity with that of the first float.

3. The invention as defined in claim 1, with the said manifolds each comprised in several tubular sections spacedly radiating from a central cylindrical member, said cylindrical member having a vertical open center and an annular channel encircling the open center within the same into which the inner ends of the tubular sections open and the outer ends thereof through the side wall of the tank, said cylindrical members constituting the aforesaid guide means for the said guide rod and guide element which slidably project through the said open centers.

4. The invention as defined in claim 1, with a cylindrical housing supported on the bottom of the tank within the same and enclosing said valve, the housing having an opening in its side wall communicating with the interior of the tank and a seat for the valve opening through its bottom in line with the water outlet, a second rod rising from said valve alongside said stem and projecting through the top of the housing, an arm extending from the first float and pivotally mounted on the top of the housing intermediate its ends, and a pivot connection between the projecting end of said second rod and the free end of said arm.

JOSEPH LEE YANCEY.

REFERENCES CITED

The following references are of record in the file of this patent:

UNITED STATES PATENTS

| Number | Name | Date |
|---|---|---|
| 569,345 | McBride | Oct. 13, 1896 |
| 690,986 | Neely | Jan. 14, 1902 |
| 924,524 | Zerkowitz | June 8, 1909 |
| 1,201,558 | Cobb | Oct. 17, 1916 |
| 1,350,151 | Gillis | Aug. 17, 1920 |
| 1,459,486 | Whitney et al. | June 19, 1923 |
| 1,741,187 | Fuqua | Dec. 31, 1929 |
| 1,750,490 | Pippin | Mar. 11, 1930 |
| 1,761,743 | Petersen | June 3, 1930 |
| 1,948,543 | Samiran | Feb. 27, 1934 |
| 2,001,809 | Worthington | May 21, 1935 |
| 2,206,835 | Combs | July 2, 1940 |
| 2,338,986 | Waterman | Jan. 11, 1944 |
| 2,401,067 | Granberg | May 28, 1946 |